3,644,327
AROMATIC AZOXY COMPOUNDS FROM
AROMATIC NITROSO COMPOUNDS
Martin A. Robinson, Orange, and Thomas J. Hurley, Jr., Madison, Conn., assignors to Olin Mathieson Chemical Corporation
No Drawing. Filed Jan. 21, 1969, Ser. No. 792,835
Int. Cl. C07c 105/00
U.S. Cl. 260—143   8 Claims

ABSTRACT OF THE DISCLOSURE

A process for preparing an aromatic azoxy compound by reacting an aromatic nitroso compound with carbon monoxide at an elevated temperature and elevated pressure.

This invention relates to a new method of preparing aromatic azoxy compounds. More particularly, it relates to the preparation of azoxy compounds by reacting an aromatic nitroso compound and carbon monoxide at elevated temperature and elevated pressure.

The reaction of this invention effects the removal of the oxygen on one of a pair of nitroso radicals with the consequent formation of an aromatic azoxy compound. The reaction can be schematically represented as follows:

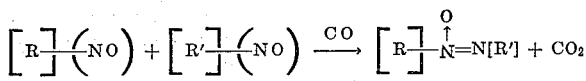

wherein R and R' are carbocyclic aryl radicals containing between about 6 and about 20 carbon atoms, and preferably between about 6 and about 14 carbon atoms. The R groups (R and R') may be unsubstituted, such as phenyl, naphthyl and the like, or can bear substituents such as alkyl, alkenyl, aryl, aralkyl, alkoxy, halogen, hydroxy, nitro, mercapto, alkylthio, carboxy, carbalkoxy, cyano, acyl, sulfo, sulfonyl, sulfoxy, isocyanato, and the like. When the R's are alike, the azoxy compound has similar substituents. When the R's are not alike, the aryl substituents on the azoxy compound may be different. The foregoing reaction may be conducted under substantially anhydrous conditions in a substantially hydrogen-free atmosphere. Although the nitroso compounds in the above equation show but a single nitroso group, the aromatic nitroso compounds can contain two, three or more nitroso substituents per molecule.

Typical of the nitroso compounds which can be converted to azoxy compounds are carbocyclic aromatic derivatives such as nitrosobenzene, o-, m- and p-dinitrosobenzene, 1-nitrosonaphthalene and 1,2-dinitrosonaphthalene. Likewise, heterocyclic derivatives may also be used.

The process of this invention is applicable to organic nitroso compounds with or without at least one other substituent, such as alkyl, alkenyl, alkoxy, halogen, acylamido, hydroxy, nitro, mercapto, alkylthio, carboxy, carbalkoxy, cyano, acyl, sulfo, sulfonyl, sulfamyl, carbamyl, phosphono, phosphino and silyl radicals.

Among the substituted nitroso compounds useful as starting materials herein, are p-nitrosotoluene,
p-nitrosoanisole,
p-nitrosophenol,
p-nitroso-m-cresol,
2-ethylnitrosobenzene,
4-chloronitrosobenzene,
4-bromonitrosobenzene,
4-fluoronitrosobenzene,
p-nitroso-N,N-dimethylaniline,
p-nitrosobenzoic acid,
1-nitroso-2-naphthol,
2-nitroso-p-xylene,
2-fluoro-4-nitrosotoluene,
1-methoxy-4-nitrosonaphthalene,
3,4-dinitrosotoluene,
4-methylthio-1-nitrosobenzene and
4-nitro-1-nitrosobenzene.

Substituents do not, in general, interfere with the reaction of this invention. Certain substituents may themselves react with carbon monoxide concurrent with the desired reaction, but the latter reaction, nevertheless, occurs. Still others may sterically retard the rate of azoxy formation without preventing it entirely. With these qualifications, the process of this invention is applicable to any organic compound with a nitroso group.

The process of this invention operates effectively in the absence of a solvent, but improved overall yields of the aromatic azoxy compounds can be obtained when a solvent which is chemically inert to the components of the reaction system is employed. Suitable solvents include halogenated aliphatic and aromatic hydrocarbons such as dichloromethane, tetrachloroethane, monochloronaphthalene, monochlorobenzene, dichlorobenzene, α-chloronaphthalene, perchloroethylene, aromatic nitro compounds such as nitrobenzene, and mixtures thereof.

The proportion of solvent is not critical and any proportion may be employed which will not require excessively large equipment to contain. Generally the weight percent of organic nitroso compound in the solvent is in the range between about 2.0 and about 75 percent, but greater or lesser proportions may be employed if desired.

The order of mixing the reactants is not critical and may be varied within the limitations of the equipment employed. In one embodiment, the organic nitroso compound, and if desired, solvent, are charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8000 p.s.i.g., but greater or lesser pressure may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The total amount of carbon monoxide added during the reaction is generally between about 1 and about 50 and preferably between about 4 and about 15 moles of carbon monoxide per nitroso group in the organic nitroso compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is maintained above about 25° C. and below 250° C. and preferably between about 100 and about 250° C. Interior and/or exterior heating and cooling means may be employed to maintain the temperature within the reactor within the desired range.

The reaction time is dependent upon the organic nitroso compound being reacted, as well as the type of equipment being employed. Usually between about ten minutes and about 20 hours are required to obtain the desired degree of reaction, but shorter or longer reaction times may be employed.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Fractional distillation is preferably employed to isolate the azoxy compound from the reaction product. However, other suitable separation techniques such as extraction, sublimation, etc., may be employed to separate the azoxy compound from the unreacted organic nitroso compound and any by-products that may be formed. Typical examples of aromatic azoxy compounds produced by the process of this invention include aromatic azoxy compounds wherein R and R' are alike, for example, azoxybenzene,
p,p'-azoxytoluene,
2,2'-azoxynaphthalene,
4,4'-bis(hexyloxy)azoxybenzene,
4,4'-bis(methylthio)azoxybenzene,
4,4'-bis(phenylsulfonyl)azoxybenzene,
3,3'-dibromoazoxybenzene,
4,4'-azoxydiphenetole,
4,4'-dinitroazoxybenzene,
4,4'-diphenylazoxybenzene,
4,4'-azoxydiphenol,
3,3'-azoxybis(acetanilide), etc.

Azoxy compounds wherein R and R' are dissimilar include, for example, 2-chloroazoxybenzene, 3-nitroazoxybenzene, etc. Aromatic azoxy compounds produced in accordance with the technique of this invention are suitable for use in preparing organic isocyanates in accordance with the process described, for example, in Canadian Pat. No. 776,703, issued Jan. 23, 1968 to Robert E. Bennett et al. This patent discloses the reaction of carbon monoxide with aromatic azoxy compounds in the presence of a catalyst comprised of a noble metal and a Lewis acid. The resulting organic isocyanates are suitable for reacting with polyether polyols and the like to prepare polyurethane foams, coatings, and the like.

The following examples are presented to further illustrate the invention without any intention of being limited thereby. All parts and percentages are by weight unless otherwise specified.

EXAMPLE 1

Into a 100 ml. stainless steel autoclave was charged 2.0 g. of nitrosobenzene and 6.0 g. of nitrobenzene as solvent. The autoclave was sealed, pressurized to 1500 p.s.i.g. and brought to 190° C. It was held at this temperature for thirty minutes, cooled, the pressure released, and the liquid contents submitted for vapor phase chromotographic analysis. The conversion of nitrosobenzene was 100 percent and the yield of azoxybenzene was 80 percent.

EXAMPLE 2

Using the same procedure as described in Example 1, except for substituting benzene for nitrobenzene as the solvent resulted in a 100 percent conversion and a 66 percent yield of azoxybenzene.

Various modifications of the invention, some of which have been disclosed above, may be employed without departing from the spirit of the invention.

What is desired to be secured by Letters Patent is:

1. A process for preparing carbocyclic aromatic azoxy compound which comprises reacting a carbocyclic aromatic nitroso compound containing from 6 to 20 carbon atoms with carbon monoxide at a temperature above 25° C. and below 250° C. and a pressure from 30 to 10,000 p.s.i.g.

2. The process of claim 1 wherein said temperature is in the range of from 100 to 250° C.

3. The process of claim 2 wherein the proportion of carbon monoxide is in the range of from 1 to 50 moles of carbon monoxide per nitroso group in said carbocyclic aromatic nitroso compound.

4. The process of claim 3 wherein said carbocyclic aromatic nitroso compound contains from 6 to 14 carbon atoms.

5. The process of claim 4 wherein said carbocyclic aromatic nitroso compound is selected from the group consisting of nitrosobenzene, para-nitroso toluene, 3,4-dinitrosotoluene and 4-nitro-1-nitrosobenzene.

6. The process of claim 5 wherein said pressure is in the range of from 100 to 8,000 p.s.i.g.

7. The process of claim 5 wherein said carbocyclic aromatic nitroso compound is nitrosobenzene.

8. The process of claim 6 wherein the proportion of carbon monoxide is in the range from 4 to 15 moles of carbon monoxide per nitroso group in said carbocyclic aromatic nitroso compound.

References Cited

UNITED STATES PATENTS 3,310,549    3/1967    Havlik et al. _____ 260—143

CHARLES B. PARKER, Primary Examiner

D. M. PAPUEA, Assistant Examiner